(12) United States Patent
Alam et al.

(10) Patent No.: US 7,079,512 B1
(45) Date of Patent: Jul. 18, 2006

(54) QUALITY INDICATOR AND METHOD FOR FRAME SELECTION IN WIRELESS NETWORK

(75) Inventors: Mahbubul Alam, Dallas, TX (US); Ramanamurthy Dantu, Richardson, TX (US); Balaji S Holur, Plano, TX (US); Tugay Eyceoz, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 09/905,489

(22) Filed: Jul. 13, 2001

(51) Int. Cl.
*H04Q 7/00* (2006.01)
*H04Q 7/20* (2006.01)
*G01R 31/08* (2006.01)

(52) U.S. Cl. .............. 370/331; 370/252; 455/442; 455/522

(58) Field of Classification Search ........ 370/331–337, 370/352–354, 252, 328, 318, 338, 465, 404, 370/419, 402, 495, 395, 397, 254, 415, 216, 370/389, 349; 455/522, 518, 69, 127, 436–439, 455/442, 435, 423, 70, 440, 67.13, 67.11, 455/453, 451, 517; 379/218.01, 223, 88.01; 725/106, 136, 122
See application file for complete search history.

(56) References Cited

U.S. PATENT DOCUMENTS

| 5,386,495 | A | * | 1/1995 | Wong et al. ............. 375/224 |
| 5,793,805 | A | * | 8/1998 | Nikides ................... 375/224 |
| 6,072,990 | A | * | 6/2000 | Agrawal et al. ........... 455/522 |
| 6,097,953 | A | * | 8/2000 | Bonta et al. .............. 455/436 |
| 6,138,020 | A | * | 10/2000 | Galyas et al. ............. 455/436 |
| 6,181,738 | B1 | | 1/2001 | Chheda et al. ............ 375/224 |
| 6,219,342 | B1 | | 4/2001 | Rege ...................... 370/318 |
| 6,226,283 | B1 | | 5/2001 | Neumiller et al. ......... 370/340 |
| 6,256,476 | B1 | * | 7/2001 | Beamish et al. ........... 340/7.36 |
| 6,308,080 | B1 | * | 10/2001 | Burt et al. ................ 455/522 |
| 6,591,104 | B1 | * | 7/2003 | Ohtani et al. ............. 455/436 |
| 6,622,023 | B1 | * | 9/2003 | Chheda .................... 455/522 |
| 6,671,518 | B1 | * | 12/2003 | Harris et al. .............. 455/518 |
| 6,728,551 | B1 | * | 4/2004 | Chang ..................... 455/522 |

OTHER PUBLICATIONS

Chuang, J.C.-I.; Sollenberger, N.R.; Uplink power control for TDMA portable radio channels☐☐Vehicular Technology, IEEE Transactions on , vol. 43 , Issue: 1 , Feb. 1994 ☐☐pp. 33-39.*

Ju-Ya Chen; Su, Y.T.; On co-channel interference measurements☐☐Personal, Indoor and Mobile Radio Communications, 1997. 'Waves of the Year 2000'. PIMRC '97., The 8th IEEE International Symposium on , vol. 2, Sep. 1-4, 1997; pp. 292-296.*

* cited by examiner

*Primary Examiner*—Alpus H. Hsu
*Assistant Examiner*—Prenell Jones
(74) *Attorney, Agent, or Firm*—Baker Botts L.L.P.

(57) ABSTRACT

A method and system for indicating quality of a radio frame transmitted over a wireless link includes receiving a radio frame from the wireless link. A power indicator for the radio frame is determined based on a power control trend of the wireless link. A quality indicator for the radio frame is generated based on the power indicator.

17 Claims, 3 Drawing Sheets

| CI | EI | LI | SI | R | QIV |
|----|----|----|----|---|-----|
| 0 | X | X | X | X | X | X | X | 0 |
| 1 | 0 | 0 | 0 | 0 | 0 | 0 | 0 | 1 |
| 1 | 0 | 0 | 0 | 0 | 0 | 1 | 0 | 2 |
| 1 | 0 | 0 | 0 | 0 | 1 | 0 | 0 | 3 |
| 1 | 0 | 0 | 0 | 0 | 1 | 1 | 0 | 4 |
| 1 | 0 | 0 | 0 | 1 | 0 | 0 | 0 | 5 |
| 1 | 0 | 0 | 1 | 0 | 0 | 0 | 0 | 6 |
| 1 | 0 | 0 | 1 | 1 | 0 | 0 | 0 | 7 |
| 1 | 0 | 0 | 0 | 1 | 0 | 1 | 0 | 8 |
| 1 | 0 | 0 | 1 | 0 | 1 | 0 | 0 | 9 |
| 1 | 0 | 0 | 1 | 1 | 1 | 1 | 0 | 10 |
| 1 | 0 | 1 | 0 | 0 | 0 | 0 | 0 | 11 |
| 1 | 1 | 0 | 0 | 0 | 0 | 0 | 0 | 12 |
| 1 | 1 | 1 | 0 | 0 | 0 | 0 | 0 | 13 |
| 1 | 0 | 1 | 0 | 0 | 0 | 1 | 0 | 14 |
| 1 | 1 | 0 | 0 | 0 | 1 | 0 | 0 | 15 |
| 1 | 1 | 1 | 0 | 0 | 1 | 1 | 0 | 16 |
| 1 | 0 | 1 | 0 | 1 | 0 | 0 | 0 | 17 |
| 1 | 1 | 0 | 1 | 0 | 0 | 0 | 0 | 18 |
| 1 | 1 | 1 | 1 | 1 | 0 | 0 | 0 | 19 |
| 1 | 0 | 1 | 0 | 1 | 0 | 1 | 0 | 20 |
| 1 | 1 | 0 | 1 | 0 | 1 | 0 | 0 | 21 |
| 1 | 1 | 1 | 1 | 1 | 1 | 1 | 0 | 22 |

| CI | EI | LI | SI | R | QIV |
|----|----|----|----|----|-----|
| 0 | X X | X X | X X | X | 0 |
| 1 | 0 0 | 0 0 | 0 0 | 0 | 1 |
| 1 | 0 0 | 0 0 | 0 1 | 0 | 2 |
| 1 | 0 0 | 0 0 | 1 0 | 0 | 3 |
| 1 | 0 0 | 0 0 | 1 1 | 0 | 4 |
| 1 | 0 0 | 0 1 | 0 0 | 0 | 5 |
| 1 | 0 0 | 1 0 | 0 0 | 0 | 6 |
| 1 | 0 0 | 1 1 | 0 0 | 0 | 7 |
| 1 | 0 0 | 0 1 | 0 1 | 0 | 8 |
| 1 | 0 0 | 1 0 | 1 0 | 0 | 9 |
| 1 | 0 0 | 1 1 | 1 1 | 0 | 10 |
| 1 | 0 1 | 0 0 | 0 0 | 0 | 11 |
| 1 | 1 0 | 0 0 | 0 0 | 0 | 12 |
| 1 | 1 1 | 0 0 | 0 0 | 0 | 13 |
| 1 | 0 1 | 0 0 | 0 0 | 1 | 14 |
| 1 | 1 0 | 0 0 | 0 1 | 0 | 15 |
| 1 | 1 1 | 0 0 | 1 1 | 0 | 16 |
| 1 | 0 1 | 0 1 | 0 0 | 0 | 17 |
| 1 | 1 0 | 1 0 | 0 0 | 0 | 18 |
| 1 | 1 1 | 1 1 | 0 0 | 0 | 19 |
| 1 | 0 1 | 0 1 | 0 1 | 0 | 20 |
| 1 | 1 0 | 1 0 | 1 0 | 0 | 21 |
| 1 | 1 1 | 1 1 | 1 1 | 0 | 22 |

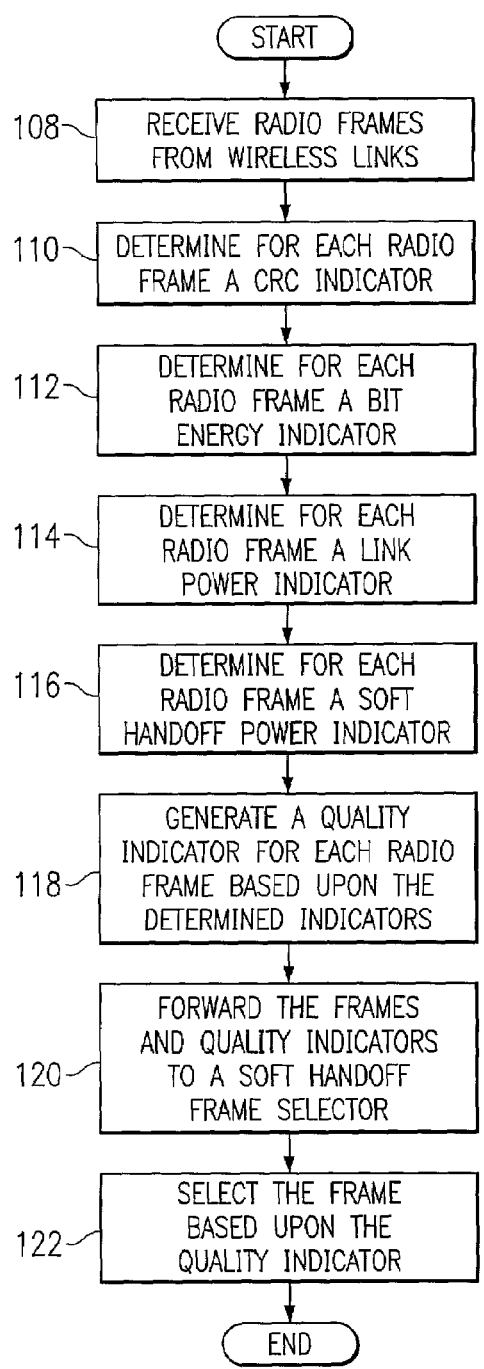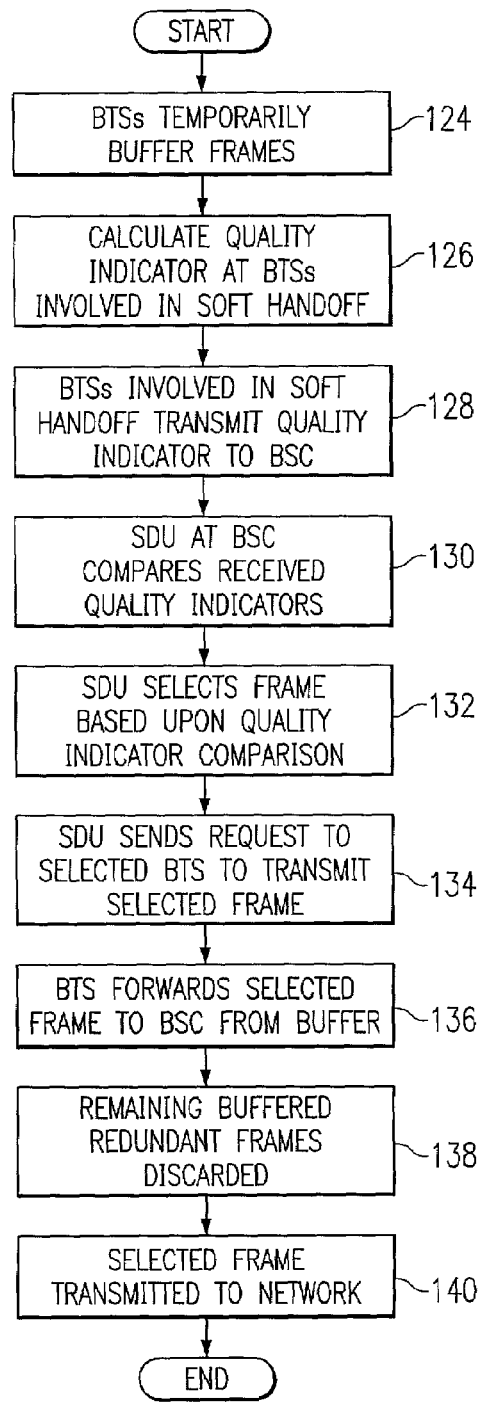

QUALITY INDICATOR AND METHOD FOR FRAME SELECTION IN WIRELESS NETWORK

TECHNICAL FIELD OF THE INVENTION

This invention relates in general to the field of wireless communications, and more particularly to a quality indicator and method for frame selection in a wireless network.

BACKGROUND OF THE INVENTION

Modern wireless networks use Code-Division Multiple Access (CDMA) technology to share frequency across multiple users and applications. To provide continual coverage and thereby maintain Quality of Service (QoS), CDMA supports a "soft handoff." In soft handoff, a mobile user communicates with a mobile switching center via two or more base transceiver station (BTS) sites and user data is broadcast and received by a number of the sites. This mode of communication makes the mobile-to-cell link resilient to obstructions in the beam path that can cause the active call to terminate abruptly. For example, for the mobile to drop a call, the paths to all of the cells would have to be obstructed.

During soft handoff, radio frames from each link of the handoff are typically compared based on a cyclic redundancy code (CRC) and a selected data frame is passed on to the network while the remaining redundant frames are discarded.

In the CRC method, a CRC character based upon the number if bits in the frame is calculated and added to the data block before the block is transmitted. The receiving end makes a similar calculation and compares its result with the CRC character. If the comparison indicates a difference, a mistake in transmission is indicated. In a wireless link, a CRC value is sent from the BTS along with the frame for soft handoff selection.

SUMMARY OF THE INVENTION

The present invention provides a link quality indicator and method for frame selection in a wireless network. In a particular embodiment, a plurality of link parameters are determined for each link and used for generating a quality indicator, which in turn is used for selecting between radio frames for soft handoff.

In accordance with one embodiment of the present invention, a radio frame is received from a wireless network. One or more link parameters, for example a power indicator based on a power control trend of the wireless link, is determined for the radio frame. A quality indicator for the radio frame is generated, based on the power indicator.

The present invention provides various technical advantages. Various embodiment of the present invention may provide some, all or none of these technical advantages.

Technical advantages of the present invention include an improved soft handoff process that uses a quality indicator including CRC and/or other quality valves for frame selection, resulting in an increase in the probability of selecting the best frame. Another technical advantage is that the quality indicator takes into account inherent information embedded within the frame such as the quality trend, direction, and interference from neighboring sectors and other mobile users. As a result, quality of the selected radio frame is enhanced and QoS of a connection is improved.

Further technical advantages may include assistance in handoff decision by predicting the mobility of the mobile device for smart/controlled handoff. Still further technical advantages may include the ability to control frame selection based upon the service type. Still further technical advantages may include backhaul traffic reduction, possibly comprising a reduction in redundant or duplicative traffic during soft handoff from base station transceivers involved in soft handoff to the base station controller.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description, taken in conjunction with the accompanying drawings, in which:

FIG. 4 is a flow diagram illustrating a method for frame selection in a wireless network in accordance with one embodiment of the present invention; and FIG. 5 is a flow diagram illustrating a method for frame selection in a wireless network in accordance with another embodiment of the present invention.

DETAILED DESCRIPTION OF THE INVENTION

Figure 1:
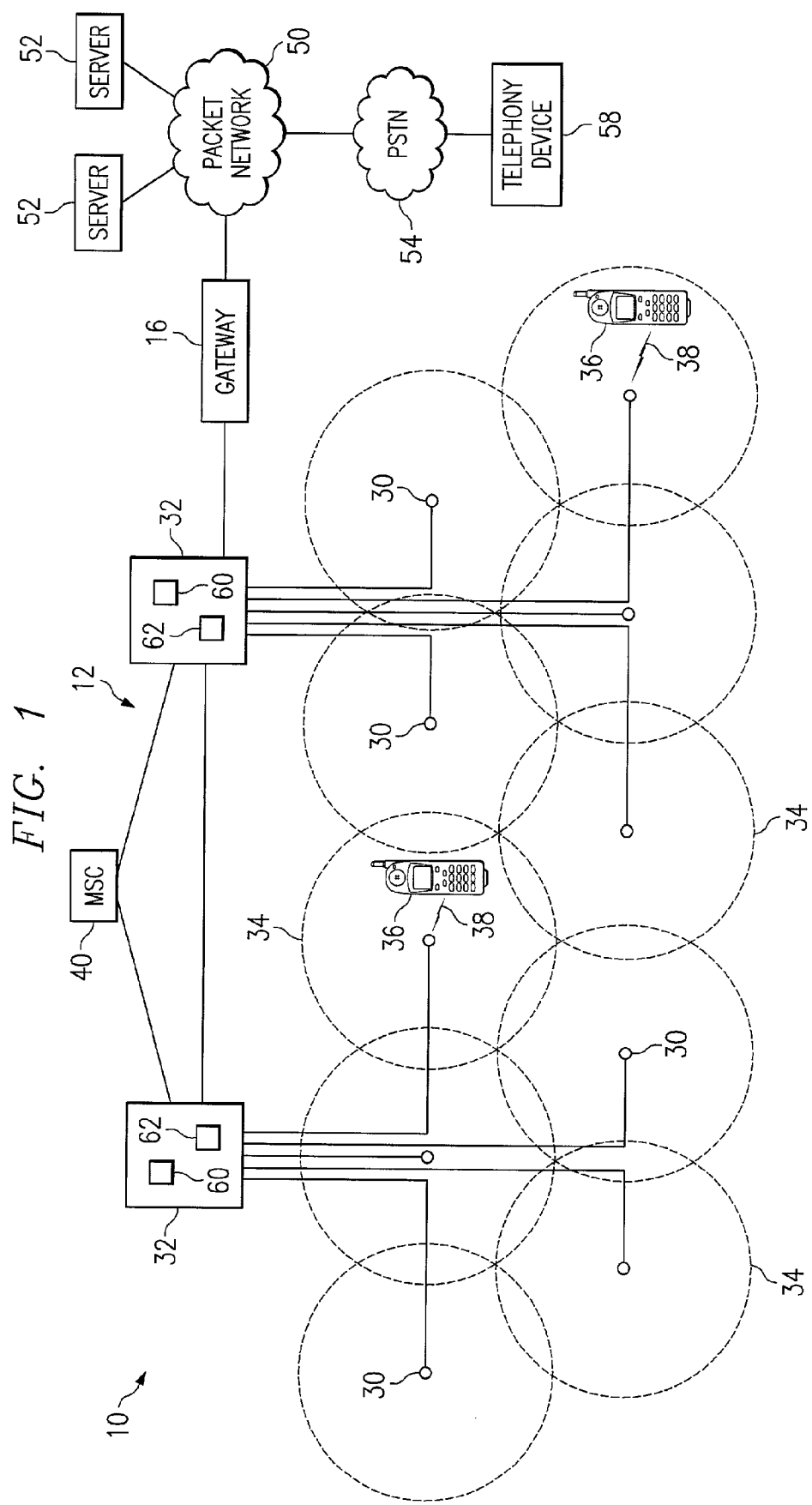
FIG. 1 is a is a block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited sectors. A sector may comprise one cell, many cells, or a portion of a cell. It will be understood that the present invention may be used in connection with other suitable wireless networks.

Referring to FIG. 1, the communications system 10 includes a wireless network 12 connected to a wireline network 14 through a gateway 16. In one embodiment, the gateway may be a packet data serving node (PDSN). The gateway 16 comprises a router that directs traffic between the wireless and wireline networks 12 and 14. It will be understood that connectivity between the wireline and wireless networks 12 and 14 may be otherwise suitably provided without departing from the scope of the present invention.

The wireless network 12 includes a number of base transceiver stations (BTSs) 30 connected to base station controllers (BSCs) 32. The BTSs 30 each cover a geographic region or sector 34 of the wireless network 12 and communicate with mobile devices 36 in the sector 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the gateway 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

In a particular embodiment of the present invention, each BSC 32 includes a selection and distribution unit (SDU) 60. The SDU 60 and/or other elements of the communication system 10 may comprise logic encoded in media. The logic may comprise software stored on the computer-readable medium, or programmed hardware such as application-specific integrated circuits (ASIC), field programmable gate arrays (FPGA) and the like. The SDU 60 may include programs, modules, functions, database tables and entries, data, routines, data storage, and other suitable elements that may be integrated or be distributed between components of the wireless network 12. Each BSC 32 may also include a lookup table 62 which may be utilized by the SDU 60 to provide soft handoff functionality. The operation of the SDU 60 and the lookup table 62 is described in further detail below.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable data network 50 connecting a number of servers 52 to each other. The packet network 50 also connects to the public switched telephone network (PSTN) 54. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets using transport control protocol/Internet protocol (TCP/IP). It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections as well as rate and other subscription information.

In operation and in accordance with a particular embodiment of the present invention, during a call or other suitable audio, video, and/or data connection a mobile device 36 is in soft handoff with one or more of the BTSs 30. Redundant radio frames are received from the mobile device 36 at the BTSs 30 in soft handoff. The redundant frames comprise originally duplicate frames transmitted through different paths, the divergence possibly causing errors or other frame quality disparities. As used herein, the frame quality comprises a lack of defects, a lack of transmission errors, a relatively intact or complete frame state, or other, similar frame statistics or characteristics. Generally, a higher frame quality represents a higher level of confidence in the received frame.

In one embodiment, each BTS 30 involved in the soft handoff generates a quality indicator (QI) for its received radio frame and forwards the QI to the BSC 32. In a particular embodiment, the QI may be appended to the corresponding radio frame and together forwarded to the BSC 32 for use by the SDU 60. In this embodiment, the QI may comprise an 8-bit binary number appended to the beginning of the radio frame. See FIG. 2 and related discussion for details of the format and derivation of the QI.

The SDU 60 in the BSC 30 compares the QIs and selects the radio frame having a QI reflecting the best frame quality. The best frame quality may correspond to a numerically highest or lowest QI or may correspond to a particular QI. If two or more frames have the same QI reflecting the best frame quality, the selected frame may be chosen at random from those frames with the same QI reflecting the best frame quality. The selected frame is passed on to the network 50 by the SDU 60 while the remaining redundant frames are discarded.

In a particular embodiment, the SDU 60 involved in soft handoff may, in selecting the frame, refer to a lookup table 62 within the BSC 32. In the particular embodiment, the lookup table 62 indicates the QI and a quality indicator value (QIV) based upon the QI. See FIG. 3 and related description herein for a further description of the lookup table 62 and the QIV in accordance with this embodiment of the present invention. It will be understood that the functionality of the lookup table may be accomplished in other ways, including but not limited to direct comparison of QIs or QIVs or a priority list of QIs or QIVs.

In another embodiment, the BTS 30 may have functionality to calculate a QIV based upon the QI, and the BTS 30 may append the QIV, instead of or in addition to the QI, to the corresponding radio frame for forwarding and use in frame selection by the SDU 60 of the BSC 32.

In yet another embodiment, the QI or the QIV is sent by the BTS 30 without the frame, and the frame is temporarily buffered in the BTS 30. In this embodiment, the SDU 60 is operable to evaluate frame quality and thus select a frame for forwarding by the BTS 30 to the BSC 32 or other network element based upon the QI or QIV. The SDU 60 then sends an order to the specific BTS 30 to send the selected frame to the BSC 32 or other node for transmittal to the network 50.

Figures 2, 3:
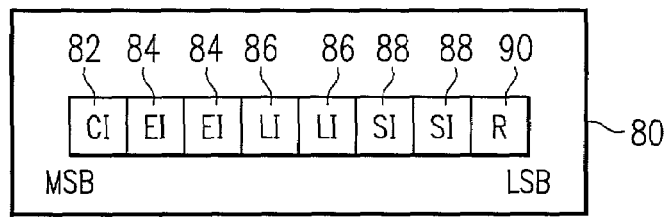
FIG. 2 is a block diagram of a quality indicator for radio frames in soft handoff in the wireless system of FIG. 1 in accordance with one embodiment of the present invention.
FIG. 3 is a diagram illustrating details of exemplary entries in the frame selection table of FIG. 1 in accordance with one embodiment of the present invention.

FIG. 2 illustrates a quality indicator (QI) 80 in accordance with one embodiment of the present invention. The QI 80 comprises one or a plurality of indicators. The QI 80 may include or otherwise reflect the results of cyclic redundancy code (CRC) check. The QI 80 may also comprise bits reflecting various inherent or other link parameters, such as bit energy and interference. Another such inherent link parameter would be power information, such as the power necessary to maintain the link. Power information may include the power requirement reflected indirectly in one embodiment by changes in, frequency of, or the trend of power control commands for the link itself and/or for the plurality of links involved in soft handoff. One, a plurality, or other of such indicators may be included in the QI 80 and used in frame selection. Furthermore, the relative significance or importance of the parameters may vary for purposes of frame selection.

In the illustrated embodiment, QI 80 comprises binary bits arranged from most significant bit (MSB) to least significant bit (LSB) in relative order of the indicators' importance for purposes of frame selection. In this embodiment, the bits include, in order of MSB to LSB, a one-bit cyclic redundancy code indicator (CI) 82, a two-bit energy indicator (EI) 84, a two-bit link power indicator (LI) 86, a two-bit soft handoff power indicator (SI) 88, and one reserved bit (R) 90. In the illustrated embodiment, the CI 82 indicates whether the cyclic redundancy code (CRC) check has been successful. If the CRC check is successful, then CI=1. If the CRC has failed, then CI=0.

The EI 84 indicates of a bit energy for the link. In the illustrated embodiment, the EI 84 is calculated using the received ratio of bit energy ($E_b$) to interference ($I_o$) (either implicit or measured) averaged over a frame duration (for example, 20 msec). The ratio is first compared to a threshold (Th). If $E_b/I_o$<Th, then EI=00. Otherwise, EI is assigned values 01, 10, or 11 depending on the magnitude of the received $E_b/I_o$ value. Generally, a higher value of EI indicates and/or corresponds to a higher quality received frame.

The LI 86 indicates if one or more types of power control commands for the wireless link 38 are increasing or decreasing. In the illustrated embodiment, the LI 86 indicates if average forward inner loop power control commands (at the BTS) over a frame duration (for example, 20 msec) has a positive slope or negative slope. If the slope is positive, then FI=00. If the slope is negative then the FI is assigned values 01, 10, or 11, depending on the steepness of the slope. Generally, a higher value of FI (i.e., steeper slope) indicates and/or corresponds to a higher quality received frame.

The SI 88 indicates if power control commands for the link and at least one other link participating in soft handoff with the first link are increasing or decreasing. In the illustrated embodiment, the SI 88 indicates if the outer loop power control trend is positive or negative over a duration (example, over 3 sec) for all links participating in soft handoff. If the slope is positive, then OI=00. If the slope is negative then the OI is assigned values 01, 10, or 11, depending on the steepness of the slope. Generally, a higher value of SI (i.e., steeper slope) indicates and/or corresponds to a higher quality received frame.

In the illustrated embodiment, the 8-bit byte is completed by one reserved bit 90. The reserved bit 90 in the present embodiment is set to 0 as a default, but in other embodiments may reflect additional parameters or information. In addition, the granularity of each indicator may be suitably increased or decreased to enhance the frame selection process based on frame quality.

FIG. 3 illustrates details of exemplary entries in the lookup table 62, showing values of QI based upon various values of CI, RI, FI, and OI in accordance with a particular embodiment of the present invention.

Referring now to FIG. 3 and in accordance with a particular embodiment of the present invention, vertical column 92 represents the one-bit binary CRC indicator (CI). As described above, the CI bit indicates whether the CRC check has succeeded or failed. In the present embodiment, a failed CRC check, represented by a zero in horizontal line 104 at CI column 92, indicates lowest frame quality regardless of other parameters. The other parameters in case of a CRC failure are irrelevant for frame selection are thus shown as Xs in horizontal line 104. Acceptable CRC checks are shown as a one (1) in the remaining lines of CI column 92.

Energy indicator (EI) column 94, link power indicator (LI) column 96, and soft handoff power indicator (SI) column 98 show, as described above, values for EI, LI, and SI represented in a two digit binary format, respectively. The one-bit reserved bit (R) column 100 contains only a zeros in the present embodiment.

In an eight-bit binary representation, a total of 256 different QI variants are possible. However, in the illustrated embodiment, only frames with the successful CRC checks would be further considered for frame selection, and only the two-bit EI, LI, and SI columns are utilized. Thus, in the illustrated embodiment, a total of 65 QI variants are possible. FIG. 3 shows twenty-three possible QI variants in accordance with a particular embodiment of the present invention.

Column 102 shows exemplary quality indicator values (QIVs) ranging from 0 to 22 assigned to the twenty-three QI variants, in accordance with the particular embodiment of the present invention shown in FIG. 3. The QIV for a given QI variant could be pre-determined by the user based upon the relative significance (weight) that the user places on the CI, EI, LI, and SI parameters. In the illustrated embodiment, QIV is based upon the following order of significance (from most significant to least significant): CI, EI, LI, and SI. The user could assign different QIVs for different QIs, depending upon the particular needs of the uses. For purposes of frame selection (and in accordance with one embodiment), the SDU 60 would utilize the lookup table 62 such that the frame with the highest QIV would be selected. Other embodiments may utilize a plurality of look-up tables, each tailored for and used in conjunction with different data subflows (e.g., different quality of service (QoS) flows), reflecting different requirements for those different flows.

FIG. 4 represents a method of frame selection in accordance with one embodiment of the present invention. The method begins with step 108, wherein radio frames are received from each the wireless links 38 in soft handoff with a mobile device 36. As used herein, the term each means every one of at least a subset of the identified items. At step 110, a CRC indicator for each radio frame is determined at the BTS 30. In a particular embodiment, the CRC indicator is based on whether the cyclic redundancy code check has failed or succeeded.

At step 112, a bit energy indicator for each radio frame is determined at the BTS 30, based upon the ratio of received bit energy at the BTS 30 to interference. A threshold value comparison may be utilized in determining the bit energy indicator. The bit energy information may be stored and updated at the BTS 30 for each frame.

At step 114, a link power indicator for each radio frame is determined at the BTS 30. In a particular embodiment, the link power indicator may be based upon the slope of average forward inner loop power control commands over a given duration. This information may be stored and updated at the BTS 30 for each frame.

At step 116, a soft handoff power indicator for each radio frame is determined at the BTS 30. The soft handoff power indicator may be based upon whether power control commands for the link and at least one other link participating soft hand with the first link are increasing or decreasing. In one embodiment, the soft handoff power indicator is based upon the slope of the outer loop power control trend for the BTSs 30 involved in soft handoff over a given duration. This information may be stored and updated at the BTS 30 for each frame. Each BTS 30 may receive updated outer loop power control trend indicators for each BTS 30 involved in soft handoff.

At step 118, a QI 80 is generated at the BTS 30 based upon CRC indicator, the bit energy indicator, the link power indicator, and the soft handoff power indicator. As used herein, based upon may mean includes eacg indicator, includes some of the indicators, or is derived in some manner from the indicators.

At step 120, in accordance with one embodiment, the frames and corresponding QI 80 are forwarded by the BTS 30 to the BSC 32. The QI 80 may be appended to the frame, or may be send by out-of-band signalling. A relatively tight delay budget (for example, 5 ms) may not be substantially affected by sending the frame along with the QI or QIV. In another embodiment, only the QI 80 or QIV is sent to the BSC 32 while the frame is temporarily buffered until and if the frame is selected. An example of this latter embodiment is detailed further in FIG. 5.

At step 122, the SDU 60 selects the frame based upon the QI 80. In a particular embodiment, the selection may be made based upon reference to a lookup table 62 with the frame having a QI corresponding to the highest QIV being selected. The lookup table 62 may be constructed to reflect the relative significance of the different indicators, depending upon the particular needs of the user. The selected frame is forwarded by the BSC 32 to the network 50, and the unselected frames are discarded.

FIG. 5 is a flow diagram illustrating a method for frame selection in a wireless network in accordance with another embodiment of the present invention. A relatively relaxed delay budget (for example, 10 ms) may not be substantially affected by not sending the frame along with the QI or QIV. The method begins with step 124, wherein each of the BTSs 30 involved in soft handoff with a mobile device 36 temporarily buffer frames received from a mobile device 36. At step 126, a QI 80 for a buffered radio frame is generated at each of the BTSs 30. The QI 80 may be generated in accordance with the steps for QI generation described in FIG. 4. Alternatively, a QIV may be calculated based upon the QI 80.

At step 128, the BTSs involved in soft handoff transmit the QI 80 (or, alternatively, the QIV) to the BSC 32. At this step, and in accordance with this particular embodiment, the corresponding frames are not transmitted along with the QI 80 or QIV.

At step 130, the SDU 60 at the BSC 32 compares the received QI 80 or QIV, and at step 132 the SDU 60 selects a frame for transmittal to the network 50 based on a highest QIV.

At step 134, the SDU 60 sends a request to the selected BTS 30 (i.e., that particular BTS 30 buffering the selected frame) for the BTS 30 to transmit the selected frame.

At step 136, the selected BTS 30 transmits the selected frame to the BSC 32. At step 138, redundant buffered frames are discarded by the other BTSs 30. In one embodiment this is done by automatically discarding or dropping the frame if no signal is received to forward within a defined period of time. At step 140, the selected frame is transmitted by the BSC 32 to the network 50.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for indicating quality of a radio frame transmitted over a wireless link, comprising:
   receiving a radio frame from a wireless link;
   determining for the radio frame a plurality of link parameters comprising a power indicator, the power indicator based on a power control trend of the wireless link;
   generating a quality indicator for the radio frame based upon the plurality of link parameters comprising the power indicator, wherein the link parameters are weighed unequally in generating the quality indicator; and
   sending the quality indicator to a frame selector operable to select the radio frame in accordance with the quality indicator.

2. The method of claim 1, wherein the power control trend comprises a slope of power control commands for the link.

3. The method of claim 1, wherein the power control trend comprises a slope of power control commands for the link and at least one other link participating in a soft handoff with the link.

4. A method for indicating quality of a radio frame transmitted over a wireless link, comprising:
   receiving a radio frame from a wireless link;
   determining for the radio frame a plurality of link parameters comprising a bit energy indicator, the bit energy indicator based on a bit energy to interference ratio;
   generating a quality indicator for the radio frame based upon the plurality of link parameters comprising the bit energy indicator, wherein the link parameters are weighed unequally in generating the quality indicator; and
   sending the quality indicator to a frame selector operable to select the radio frame in accordance with the quality indicator.

5. A method for indicating quality of a radio frame transmitted over a wireless link, comprising:
   receiving a radio frame from a wireless link;
   determining a quality indicator for the frame based upon a plurality of link parameters, wherein the link parameters are weighed unequally in determining the quality indicator; and
   sending the quality indicator to a frame selector operable to select the radio frame in accordance with the quality indicator.

6. The method of claim 5, wherein the link parameters comprise:
   a bit energy indicator, the bit energy indicator based on a bit energy to interference ratio; and
   a power indicator, the power indicator based on a power control trend of the wireless link.

7. A system for indicating quality of a radio frame transmitted over a wireless link, comprising:
   means for receiving a radio frame from a wireless link;
   means for determining for the radio frame a plurality of link parameters comprising a power indicator, the power indicator based on a power control trend of the wireless link;
   means for generating a quality indicator for the radio frame based upon the plurality of link parameters comprising the power indicator, wherein the link parameters are weighed unequally in generating the quality indicator; and
   means for sending the quality indicator to a frame selector operable to select the radio frame in accordance with the quality indicator.

8. The system of claim 7, wherein the power control trend comprises a slope of power control commands for the link.

9. The system of claim 7, wherein the power control trend comprises a slope of power control commands for the link and at least one other link participating in a soft handoff with the link.

10. A system for indicating quality of a radio frame transmitted over a wireless link, comprising:
  means for receiving a radio frame from a wireless link;
  means for determining for the radio frame a plurality of link parameters comprising a bit energy indicator, the bit energy indicator based on a bit energy to interference ratio;
  means for generating a quality indicator for the radio frame based upon the plurality of link parameters comprising the bit energy indicator, wherein the link parameters are weighed unequally in generating the quality indicator; and
  means for sending the quality indicator to a frame selector operable to select the radio frame in accordance with the quality indicator.

11. A system for indicating quality of a radio frame transmitted over a wireless link, comprising:
  means for receiving a radio frame from a wireless link;
  means for determining a quality indicator for the frame based upon a plurality of link parameters, wherein the link parameters are weighed unequally in determining the quality indicator; and
  means for sending the quality indicator to a frame selector operable to select the radio frame in accordance with the quality indicator.

12. The system of claim 11, wherein the link parameters comprise:
  a bit energy indicator, the bit energy indicator based on a bit energy to interference ratio; and
  a power indicator, the power indicator based on a power control trend of the wireless link.

13. A method for soft handoff, comprising:
  receiving over a each of a plurality of soft handoff links a radio frame;
  for each radio frame determining a quality indicator, the quality indicator generated based upon a plurality of link parameters comprising at least:
    a bit energy indicator, the bit energy indicator based on a bit energy to interference ratio;
    a power indicator, the power indicator based on a power control trend of the wireless link, wherein the link parameters are weighed unequally in generating the quality indicator;
  forwarding the frame and quality indicator to a base station controller; and
  selecting one of the frames based on the quality indicator.

14. A method for soft handoff, comprising:
  at each of a plurality of transceivers in communication with one of a plurality of soft handoff links for a connection:
    receiving a redundant radio frame;
    temporarily holding the redundant radio frame;
    determining a quality indicator for the redundant radio frame;
    transmitting to a frame selector the quality indicator;
  selecting at the frame selector one of the redundant frames as a selected frame, such selection based upon the quality indicator received from each transceiver;
  requesting the selected frame from the transceiver holding the selected frame; and
  forwarding the selected frame for transmitting in the connection.

15. The method of claim 14, further comprising discarding the redundant radio frames that are not the selected frame.

16. A system for indicating quality of a radio frame transmitted over a wireless link comprising logic encoded in media, the logic operable to:
  receive a radio frame from a wireless link;
  determine for the radio frame a plurality of link parameters comprising a power indicator, the power indicator based on a power control trend of the wireless link;
  generate a quality indicator for the radio frame based upon the plurality of link parameters comprising the power indicator, wherein the link parameters are weighed unequally in generating the quality indicator; and
  send the quality indicator to a frame selector operable to select the radio frame in accordance with the quality indicator.

17. A system for indicating quality of a radio frame transmitted over a wireless link comprising logic encoded in media, the logic operable to:
  receiving a radio frame from a wireless link;
  determining a quality indicator for the frame based upon a plurality of link parameters, wherein the link parameters are weighed unequally in determining the quality indicator; and
  sending the quality indicator to a frame selector operable to select the radio frame in accordance with the quality indicator.

* * * * *